2,817,684

N,N'-DISUBSTITUTED MONOUREAS

Newman M. Bortnick, Oreland, Pa., assignor to Rohm & Haas Company, Philadelphia, Pa., a corporation of Delaware No Drawing. Application June 3, 1954
Serial No. 434,315

8 Claims. (Cl. 260—553)

This invention relates to a method for the preparation of symmetrical N,N'-disubstituted monoureas. It also relates to a method for preparing symmetrical N,N'-disubstituted monoureas that is essentially quantitative and yields products of high purity.

It is known that an alkyl primary amine and an alkyl isocyanate can be reacted to form a dialkylsubstituted urea. The size and character of the carbon chain of the alkyl group is substantially unlimited and therefore a wide variety of ureas can be made from this known reaction. The reaction is known to be reversible when the alkyl groups are tertiary, that is, when a tertiary carbon is attached directly to each of the urea nitrogens, so that a tertiary alkyl amine and a tertiary alkyl isocyanate can be produced from the corresponding ditertiaryalkylsubstituted urea by employing a pyrolytic method. This reversible reaction has never been noticed when primary or secondary alkyl groups are employed instead of the tertiary alkyl groups.

Furthermore, it is known that symmetrical N,N'-disubstituted ureas can be prepared through the agency of phosgene. The reaction is frequently troublesome in that problems of product separation are tedious and extreme care must be exercised in the handling of the very toxic phosgene. Nevertheless, symmetrical N,N'-disubstituted ureas are commonly made through the use of phosgene.

The present invention shows a method for directly preparing particular symmetrical N,N'-disubstituted monoureas from the corresponding unsymmetrical N,N'-disubstituted monoureas, according to the reaction

2RNHCONHR' → RNHCONHR + R'NHCONHR' in which R is a tertiary alkyl group of 4 to 18 carbon atoms, preferably of 4 to 10 carbon atoms, and R' is either a primary or secondary, that is, non-tertiary, alkyl, alkenyl, cycloalkyl, or arylalkyl group of one to eighteen carbon atoms or an aryl or alkylaryl group. Also, R' may include as a substituent a tertiary amino, an alkoxy, an alkenoxy, an amido, or a cyano group, if desired. Actually, the only limitation on the types of groups possible in R' is based on thermal stability. Groups that are stable up to 300° C. may be used. Groups that would react or split at such temperatures would be unsatisfactory for the present purposes as will be apparent hereinafter. The tertiary carbon atom of the R group should be directly attached to one of the urea nitrogens. The non-tertiary, that is primary or secondary, carbon atoms of the alkyl, alkenyl, cycloalkyl or arylalkyl R' group or the carbon atom of the aryl or alkylaryl R' group should be attached directly to the other of the urea nitrogens.

Among the typical R members that may be employed are tertiary butyl, tertiary hexyl, tertiary octyl, tertiary decyl, tertiary dodecyl, tertiary tetradecyl, and tertiary octadecyl groups. Among the typical R' members are alkyl groups such as methyl, butyl, octyl, nonyl, decyl, tetradecyl, and octadecyl; alkenyl groups such as butenyl, octenyl, undecenyl, tetradecenyl, and octadecenyl; cycloalkyl groups such as cyclopentyl, cyclohexyl, propylcyclopentyl, hexylcyclohexyl, and pentyloctylcyclopentyl; aryl groups such as phenyl and naphthyl; arylalkyl groups such as benzyl, hexylbenzyl, undecylbenzyl; alkylaryl groups such as propylphenyl, tolyl, xylyl, trimethylphenyl, hexylphenyl, octylphenyl, dodecylphenyl, methylnaphthyl, and octylnaphthyl. R' may also be a dimethylaminoethyl, dimethylaminopropyl, dipropylaminobutyl, ethoxyethyl, ethoxyethoxyethoxyethyl, propoxypentyl, vinyloxypropyl, allyloxypropyl, vinoxybutyl, alloxyoctyl, acrylamidoethyl, methacrylamidomethyl, acetamidohexyl, cyanohexyl, cyanodecyl, or cyanotetradecyl group or the like.

The formation of the symmetrical N,N'-disubstituted urea, according to the present invention, is accomplished by heating the corresponding unsymmetrical N,N'-disubstituted urea at the reaction temperature which is in the temperature range of 175° to 300° C., at atmospheric or reduced pressures. Preferred conditions are 175° to 250° C. and pressures less than atmospheric down to 1 mm. From one unsymmetrical N,N'-disubstituted urea two symmetrical N,N'-disubstituted ureas are produced as has been shown above. As the symmetrical N,N'-di-tert-alkyl substituted urea is formed, it distills from the reaction medium and is collected in a receiver. The cessation of product collection in the receiver is an indication of reaction completion. Frequently, the product collected in the receiver condenses as a viscous liquid or a crystalline solid. The symmetrical N,N'-di-primary or disecondary substituted urea usually remains as the residue but some of the lower boiling members may be distilled, if desired. In any case, separation of the products occurs as the reaction progresses. No additional steps of separation or purification are ordinarily needed. Although the symmetrical N,N'-di-tert-alkyl substituted ureas are normally viscous liquids or crystalline solids, these ureas at the instant reaction temperatures apparently are in equilibrium with the corresponding isocyanate and amine as is shown by the equation

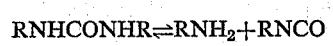

RNHCONHR ⇌ RNH₂ + RNCO

These amines and isocyanates are readily distillable and as they are collected together evidently combine to again form the urea. This explanation is in conformity with the scientific observations made in connection with the subject reaction, particularly since it has been noticed that the reflux temperature during the course of the reaction is a reflection of the particular isocyanate and amine being distilled. The present reaction effectively begins at a temperature of about 175° C. as has been already set forth. Thereafter, the temperature is substantially controlled by the distillation range of the particular isocyanate and amine concerned. None of the present compounds demands a temperature above about 300° C.

The reaction progresses satisfactorily without the aid of a catalyst and essentially quantitative results are consistently obtained. The products are water-white to yellow liquids or white to yellow crystalline solids that are valuable as oil additives to improve the viscosity indices of oils and to inhibit corrosion, and as solvents for polymeric compositions.

If the starting compound of this reaction, the unsymmetrical urea, is made from a primary monoamine and an isocyanate, it is unimportant whether the R or R' group is in the amine or the isocyanate, although for convenience it is somewhat preferable for the R to be on the isocyanate, just so one of each of the groups R and R' is present in the unsymmetrical urea formed. The unsymmetrical urea is easily made from an isocyanate and a primary monoamine so that the starting compounds of the present invention are readily accessible. By selecting the proper primary monoamine and the proper isocyanate a particular, desired symmetrical urea may be produced by way of the corresponding unsymmetrical urea.

The starting compounds of this invention may be made according to the following preparations in which parts by weight are used throughout.

PREPARATION A

To 31 parts of tert-octyl isocyanate, 28.6 parts of 3,5,5-trimethylhexylamine was slowly added. Heat was evolved and the mixture became quite viscous and finally crystallized. The product was recrystallized from isooctane and had a melting point of 81°–84° C. The product was N-tert-octyl-N'-3,5,5-trimethylhexylurea. The same result was obtained by reacting tert-octylamine with 3,5,5-trimethylhexyl isocyanate.

PREPARATION B

Gaseous monomethylamine was slowly introduced into a solution of 31 parts of tert-octyl isocyanate and 200 parts of isooctane. Heat was evolved and the reactants were cooled by the use of an ice bath. The introduction of amine was continued until a slight excess was present in the reactant medium. The mixture was filtered and the solid filtered off was washed with cold isooctane and air dried. The solid product was the expected N-tert-octyl-N'-methylurea.

PREPARATION C

A mixture of 19.8 parts of tert-butyl isocyanate and 33.8 parts of undecenylamine reacted with the evolution of heat. The mixture was cooled with an ice bath and then filtered. The product was N-tert-butyl-N'-undecenylurea.

PREPARATION D

To 42.2 parts of tert-dodecyl isocyanate there was added 17 parts of cyclopentylamine. Heat was evolved and an ice bath was employed to maintain a low temperature. The product was identified as N-tert-dodecyl-N'-cyclopentylurea.

PREPARATION E

A mixture of 31 parts of tert-octyl isocyanate and 18.6 parts of aniline reacted at a slow rate. The addition of 0.5 parts of sodium methoxide caused the reaction to go to completion. The product, N-tert-octyl-N'-phenylurea, was crystalline and had a melting point of 136°–138° C. The identical product was obtained by reacting tert-octylamine with phenyl isocyanate.

PREPARATION F

There were added together 21.4 parts of benzylamine and 31 parts of tert-octyl isocyanate. The product formed was N-tert-octyl-N'-benzylurea. Similarly, trimethylphenylamine and tert-decyl isocyanate reacted to form N-tert-decyl-N'-trimethylphenylurea.

PREPARATION G

A mixture of 17.6 parts of dimethylaminoethylamine and 31 parts of tert-octyl isocyanate reacted at a moderate rate. Some heat was evolved and the product corresponded to N-tert-octyl-N'-dimethylaminoethylurea.

PREPARATION H

To 29.2 parts of propoxypentylamine there was added 25.4 parts of tert-hexyl isocyanate. Heat was evolved and a gummy residue formed. The residue corresponded to N-tert-hexyl-N'-propoxypentylurea.

PREPARATION I

There were mixed together 19.8 parts of vinylbutylamine and 36.6 parts of tert-decyl isocyanate. The components reacted with the evolution of heat. An ice bath was used to keep the mixture cool. The product formed was identified as N-tert-decyl-N'-vinylbutylurea.

PREPARATION J

A mixture of 37 parts of alloxyoctylamine and 42.2 parts of tert-dodecyl isocyanate reacted spontaneously with the evolution of heat. The speed of reaction was controlled with an ice bath. The product corresponded to N-tert-dodecyl-N'-alloxyoctylurea.

PREPARATION K

To 31 parts of tert-octyl isocyanate there was added 29.2 parts of acetamidohexylamine. An immediate exothermic reaction occurred. At the conclusion of the reaction the product was identified as N-tert-octyl-N'-acetamidohexylurea.

PREPARATION L

There were mixed together 25.4 parts of tert-hexyl isocyanate and 47.2 parts of cyanotetradecylamine. The components reacted spontaneously with the evolution of heat. At the conclusion of the reaction the product was identified as N-tert-hexyl-N'-cyanotetradecylurea.

The unsymmetrical ureas, which can be readily prepared in the manner shown above or otherwise as desired, are used as the starting compounds to form the corresponding symmetrical ureas, in the manner of the present invention, as is shown in the following illustrative examples.

*Example 1*

There was charged to a distillation flask equipped with a condenser 30 parts by weight of N-tert-octyl-N'-3,5,5-trimethylhexylurea. The contents of the flask were heated gradually and at about 180° C. the first signs of a distillate were noticed in the condenser. The temperature in the flask was increased gradually to 280° C. and the pressure was gradually reduced as the reaction progressed. The distillate was collected in the receiver where crystallization occurred. The distillate was recrystallized from isooctane and had a melting point of 160° C. A mixed melting point with a known pure sample of N,N'-di-tert-octylurea gave no depression. The residue was a viscous liquid that corresponded to N,N'-di-3,5,5-trimethylhexylurea. In an analogous manner, N,N'-di-tert-dodecylurea and N,N'-dicyclopentylurea were produced from the unsymmetrical N-tert-dodecyl-N'-cyclopentylurea.

*Example 2*

Into a distillation flask equipped with a short column, a distillation sidearm, and receiver there was introduced 40 parts of N-tert-octyl-N'-methylurea. Heat was applied to the system until the temperature was about 175°–180° C. at which point the reaction started. The temperature was increased as the reaction and concomitant distillation progressed. At about 225° C. there was a hiatus in the distillation indicating that all of the lower boiling component has been removed. A second and final distillate fraction was taken in the range of 255°–275° C. The lower boiling distillate crystallized and was recrystallized from isooctane. It gave a melting point of 160° C. and was identified as N,N'-di-tert-octylurea. The higher boiling distillate crystallized and was recrystallized from ethylene dichloride. It gave a melting point of 105°–106° C. and was identified as N,N'-dimethylurea. A mixed melting point gave no depression, thus further substantiating the identification of the product.

There were produced in a similar manner the symmetrical ureas, N,N'-di-tert-butylurea and N,N'-diundecenylurea from unsymmetrical N-tert-butyl-N'-undecenylurea.

*Example 3*

There was added into a distillation flask equipped with a column, a distillation sidearm, and receiver 40 parts of N-tert-octyl-N'-phenylurea. Heat was applied until at 180°–195° C. distillation began. The temperature was eventually increased to 280° C. until the reaction was completed. The distillate was recrystallized and was identified as N,N'-di-tert-octylurea. A mixed melting point with a known, pure sample of N,N'-di-tert-octylurea gave no depression. The residue was recrystallized and gave a melting point of 235°–237° C. A mixed melting point was run using a known, pure sample of N,N'-diphenylurea with no depression of the melting point.

*Example 4*

A portion of N-tert-octyl-N'-benzylurea was placed in a distillation flask having a column, distillation sidearm, and receiver. Heat was applied to the flask and at 180°–200° C. distillation began. The heat was gradually increased until 275°–290° C. at which time the reaction was complete. The distillate was recrystallized from isooctane and gave a melting point of 160° C. The distillate was identified as N,N'-di-tert-octylurea and the identity substantiated by conducting a mixed melting point with a known, pure sample which showed no depression. The residue was recrystallized and identified as N,N'-dibenzylurea.

In a similar manner, the symmetrical ureas N,N'-di-tert-decylurea and N,N'-ditrimethylphenylurea were produced from the unsymmetrical N-tert-octyl-N'-trimethylphenylurea.

*Example 5*

A portion of N-tert-octyl-N'-dimethylaminoethylurea was introduced into a flask equipped with a short column and a sidearm distillate receiver. Heat was applied until distillation occurred. As the distillation progressed the heat was increased until it ultimately reached 275° C. at which time the reaction was completed. The distillate solidified in the receiver and was recrystallized from and then washed with isooctane. A melting point of 160° C. was observed with the recrystallized distillate and a mixed melting point with a known, pure sample of N,N'-di-tert-octylurea gave no depression. The residue was identified as N,N'-bis(dimethylaminoethyl)urea.

*Example 6*

There was added to a distillation flask, filled with a column, a sidearm condenser, and a distillate receiver, a portion of N-tert-hexy-N'-propoxypentylurea. Heat was applied and at 180° C. evidence of distillation was noticed. Heat was gradually increased and at 275° C. the reaction was complete. The distillate was identified as N,N'-di-tert-hexylurea and the residue corresponded to N,N'-dipropoxypentylurea.

*Example 7*

Into a distillation flask equipped with a short column, a distillation sidearm, and a receiver there was introduced 50 parts of N-tert-decyl-N'-vinylbutylurea. Heat was applied to the system and a distillation started. Heat was increased gradually and the pressure was slowly reduced as the reaction continued, until finally when the temperature reached 285° C. the reaction was complete. The distillate was identified as N,N'-di-tert-decylurea. The residue corresponded to N,N'-bis(vinylbutyl)urea.

*Example 8*

A sample of N-tert-dodecyl-N'-alloxyoctylurea was charged to a distillation flask having a column and sidearm receiver. Heat was applied to the system and a reaction ensued. As the reaction proceeded a distillate was collected in the receiver. The temperature of the system was gradually increased to 290° C. and the pressure was gradually reduced until the reaction was completed. The crystallized distillate was recrystallized from isododecane and identified as N,N'-di-tert-dodecylurea. The residue was a gummy solid that corresponded to N,N'-bis(alloxyoctyl)urea.

*Example 9*

There was charged to a distillation flask, supplied with a column and sidearm receiver, a portion of N-tert-octyl-N'-acetamidohexylurea. Heat was applied to the system to induce a reaction and a distillation started at 175° C. As the distillation progressed the temperature was gradually raised until it finally reached 280° C. at which time the reaction was complete. The distillate crystallized in the receiver and was recrystallized from isooctane. The distillate was identified as N,N'-di-tert-octylurea. A mixed melting point with a known, pure sample of N,N'-di-tert-octylurea gave no depression. The residue corresponded to N,N'-bis(acetamidohexyl)urea.

*Example 10*

There was placed in a distillation flask a sample of N-tert-hexyl-N'-cyanotetradecylurea. Heat was applied and distillation occurred. The distillate corresponded to N,N'-di-tert-hexylurea. The residue was identified as N,N'-bis(cyanotetradecyl)urea.

I claim:

1. A method for preparing symmetrical N,N'-disubstituted ureas which comprises heating at the reaction temperature in the range of about 175° to 300° C. an unsymmetrical N,N'-disubstituted urea of the formula

RNHCONHR' in which R is an alkyl group of four to eighteen carbon atoms having a tertiary carbon atom attached directly to one of the urea nitrogens and R' is a hydrocarbon group of one to eighteen carbon atoms, said R' group being thermally stable at least substantially above the reaction temperature and having a non-tertiary carbon atom attached directly to the other of the urea nitrogens.

2. A method for preparing symmetrical N,N'-disubstituted ureas according to the reaction

2RNHCONHR' → RNHCONHR + R'NHCONHR' in which R is an alkyl group of four to eighteen carbon atoms having a tertiary carbon atom attached directly to one of the urea nitrogens and R' is a hydrocarbon group of one to eighteen carbon atoms, said R' group being thermally stable at least substantially above the reaction temperature and having a non-tertiary carbon atom attached directly to the other of the urea nitrogens which comprises heating said

RNHCONHR' at the reaction temperature in the range of 175° to 250° C.

3. A method for preparing symmetrical N,N'-disubstituted ureas according to the reaction

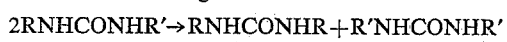

2RNHCONHR' → RNHCONHR + R'NHCONHR' in which R is an alkyl group of four to eighteen carbon atoms having a tertiary carbon atom attached directly to one of the urea nitrogens and R' is a hydrocarbon group of one to eighteen carbon atoms, said R' group being thermally stable at least substantially above the reaction temperature and having a non-tertiary carbon atom attached directly to the other of the urea nitrogens which comprises heating at the reaction temperature said

RNHCONHR' in the range of 175° to 250° C. at pressures less than atmospheric down to 1 mm. until distillation ceases and obtaining said

RNHCONHR as the distillate and said R'NHCONHR' as the residue.

4. A method for the preparation of symmetrical N,N'-disubstituted ureas according to the reaction

C₈H₁₇NHCONHR' → C₈H₁₇NHCONHC₈H₁₇ + R'NHCONHR' in which R' is a member of the class consisting of alkyl, alkenyl, cycloalkyl, aryl, arylalkyl, and alkylaryl groups of one to eighteen carbon atoms, said R' groups having a non-tertiary carbon atom attached directly to one of the urea nitrogens and being thermally stable at least substantially above the reaction temperature and in which said $C_8H_{17}$ group has a tertiary carbon atom attached directly to the other of the urea nitrogens, which comprises heating said $C_8H_{17}$NHCONHR′ at a reaction temperature in the range of 175° to 250° C. at pressures less than atmospheric down to 1 mm. until distillation ceases and obtaining said $C_8H_{17}$NHCONH$C_8H_{17}$ as the distillate and said R′NHCONHR′ as the residue.

5. A method for the preparation of symmetrical N,N′-disubstituted ureas according to the reaction

RNHCONHR′ → RNHCONHR + R′NHCONHR′ in which R is an alkyl group of four to ten carbon atoms wherein said R group contains a tertiary carbon atom attached directly to one of the urea nitrogens and R′ is an alkyl group of one to eighteen carbon atoms wherein said R′ group has a non-tertiary carbon atom attached directly to the other of the urea nitrogens, which comprises heating said RNHCONHR′ at a reaction temperature in the range of 175° to 250° C. at pressures less than atmospheric down to 1 mm. until distillation ceases and obtaining said RNHCONHR as the distillate and said R′NHCONHR′ as the residue.

6. A method for the preparation of symmetrical N,N′-disubstituted ureas which comprises heating N-tert-octyl-N′-methylurea at a reaction temperature in the range of 175° to 250° C. at pressures less than atmospheric down to 1 mm. until distillation ceases and obtaining N,N′-di-tert-octylurea as the distillate and N,N′-dimethylurea as the residue.

7. A method for the preparation of symmetrical N,N′-disubstituted ureas which comprises heating N-tert-octyl-N′-benzylurea at a reaction temperature in the range of 175° to 250° C. at pressures less than atmospheric down to 1 mm. until distillation ceases and obtaining N,N′-di-tert-octylurea as the distillate and N,N′-dibenzylurea as the residue.

8. A method for the preparation of symmetrical N,N′-disubstituted ureas which comprises heating N-tert-decyl-N′-vinylbutylurea at a reaction temperature in the range of 175° to 250° C. at pressures less than atmospheric down to 1 mm. until distillation ceases and obtaining N,N′-di-tert-decylurea as the distillate and N,N′-bis(vinylbutyl)urea as the residue.

References Cited in the file of this patent

UNITED STATES PATENTS 2,611,782    Bortnick _____ Sept. 23, 1952